(12) United States Patent
Hedley

(10) Patent No.: US 6,813,529 B2
(45) Date of Patent: Nov. 2, 2004

(54) METHOD AND APPARATUS FOR SIGNAL FREQUENCY DECODING WITHOUT AN ANALOG BANDPASS FILTER

(75) Inventor: David Hedley, Chandler, AZ (US)

(73) Assignee: Microchip Technology Incorporated, Chandler, AZ (US)

(*) Notice: Subject to any disclaimer, the term of this patent is extended or adjusted under 35 U.S.C. 154(b) by 819 days.

(21) Appl. No.: 09/766,094

(22) Filed: Jan. 19, 2001

(65) Prior Publication Data

US 2002/0138164 A1 Sep. 26, 2002

(51) Int. Cl.[7] .............................. H04M 1/00; H04M 3/00
(52) U.S. Cl. ........................................ 700/94; 379/386
(58) Field of Search ............................ 700/94; 379/386, 379/93.26, 282, 283

(56) References Cited

U.S. PATENT DOCUMENTS

| | | | |
|---|---|---|---|
| 3,882,283 A | 5/1975 | Proudfoot | 179/84 |
| 4,479,188 A | 10/1984 | de Keijzer | 364/484 |
| 4,617,427 A | 10/1986 | Vea et al. | 179/84 |
| 5,644,634 A * | 7/1997 | Xie et al. | 379/386 |
| 6,683,939 B1 * | 1/2004 | Chiloyan et al. | 379/386 |

OTHER PUBLICATIONS

International Search Report PCT/US 02/01816, Mailed Nov. 20, 2002.

* cited by examiner

*Primary Examiner*—Stella Woo
(74) *Attorney, Agent, or Firm*—Baker Botts L.L.P.

(57) ABSTRACT

An apparatus and method are provided for decoding single-frequency or multi-frequency signals, such as DTMF signals, without the use of analog bandpass filters. The method of the present invention is equally applicable to any decoding of multi-frequency signals. The method is composed of a number of steps. First, an incoming (analog) signal is received and transformed into binary signals (1 or 0) at specific instances of time. The incoming binary signal is compared to a pre-defined expected (binary) signal at each time step. The incoming and expected bit values for each time step are then compared and the comparison result is stored as part of a frequency response table. The comparison values are then summed and, if the summed value exceeds a pre-defined threshold, the incoming and expected signals are declared a match. Otherwise, the signals are declared a mis-match.

18 Claims, 7 Drawing Sheets

METHOD AND APPARATUS FOR SIGNAL FREQUENCY DECODING WITHOUT AN ANALOG BANDPASS FILTER

BACKGROUND OF THE INVENTION

1. Field of the Invention

The present invention is related to signal processing. More specifically, the present invention is related to the decoding of single or multi-tone multi-frequency signals.

2. Background of the Related Art

In the art of signal processing, DTMF stands for Dual-Tone Multi-Frequency. DTMF signaling has many applications such as telephone dialing, data entry, credit checking, and voice mail system control. A DTMF signal consists of two superimposed sinusoidal waveforms with frequencies that are chosen from a set of eight standardized frequencies. Typically, these frequencies are generated and detected according to a standard such as the CCITT Recommendation Q.23 and Q.24. See, for example, "Recommendation Q.23: Technical Features of Push-Button Telephone Sets" (CCITT Blue Book, Geneva, 1989); and "Recommendation Q.24: Multi-Frequency Push-Button Signal Reception" (CCITT Blue Book, Geneva, 1989). See also G. Arslan, B. Evans, F. Sakarya, and J. Pino, "Performance Evaluation and Real-Time Implementation of Subspace, Adaptive, and DFT Algorithms for Multi-tone Detection" (available at http://ptolemy.eecs.berkeley.edu/papers/96/dtmf_ict/). Moreover, the DTMF frequencies are effectively divided into two subsets. One subset contains the lower four frequencies, and the other subset contains the upper four frequencies. Each DTMF tone is defined by the presence of exactly one of the frequencies from each of those subsets. Table 1 shows the two groups and their associated frequencies.

TABLE 1

Signal Frequencies

| | Frequency (Hz) | | | |
|---|---|---|---|---|
| Low Group | 697 | 770 | 852 | 941 |
| High Group | 1209 | 1336 | 1477 | 1633 |

According to the CCITT Recommendation, the frequency tolerance in operation is less than or equal to 1.5% in operation and greater than or equal to 3.5% in non-operation. In addition to frequency specification and tolerance, the CCITT also specifies signal receptions timing as shown in Table 2.

TABLE 2

Signal Reception Timing

| | |
|---|---|
| Signal Duration/Operation | 40 ms (minimum) |
| Signal Duration/Non-Operation | 23 ms (maximum) |
| Pause Duration | 40 ms (minimum) |
| Signal Interruption | 10 ms (maximum) |

Table 3 illustrates the frequencies that compose the tones in terms of a telephone touch pad. For example, referring to Table 3, the tone for the "8" button is represented with the superposition (sum) of the 852 Hz and the 1336 Hz sinusoidal waveforms. Generally speaking, the energy of the sinusoidal waveforms present in the generated tone should exceed the energy present at any other frequencies by 30 dB.

TABLE 3

Common DTMF Frequencies for Touch Tone Pads

| | | High-Group Frequencies (Hz) | | | |
|---|---|---|---|---|---|
| | | 1209 | 1336 | 1477 | 1633 |
| Low-Group Frequencies (Hz) | 697 | 1 | 2 | 3 | A |
| | 770 | 4 | 5 | 6 | B |
| | 852 | 7 | 8 | 9 | C |
| | 941 | 0 | 0 | # | D |

The digits 0 though 9 and the characters * and # are used in public telecommunications services. The characters A through D are reserved for use in non-public telecommunications networks. Although the character D is sometimes used as an identifier in Caller Identification signaling on the public network.

Estimating the frequencies of multiple signals (such as DTMF signals) in noise is an important problem in signal processing. In the prior art, these signals were estimated using subspace techniques such as Multiple Signal Classification (MUSIC), adaptive techniques such as Least Mean-Square (LMS) estimation, or fast implementations of discrete Fourier transform (DFT) such as the Goertzel algorithm. The choice of which of the three techniques depended upon a trade-off between the observation time and the available computational resources. For example, according to Arslan, et al, the Goertzel algorithm is more efficient than the Fast Fourier Transform in computing an N-point DFT if less than $2 \log_2 N$ DFT coefficients are required.

Prior art DTMF Decoder integrated circuits (IC) generally included the following elements:

Data collection mechanism;

A time domain to frequency domain conversion (Fourier Transform);

A bank of 8 Narrow Bandpass Filters;

Decision Making; and

Output.

It would be advantageous, however, to eliminate the need for the bank of narrow bandpass filters. It is an object of the present invention to overcome the problems and limitations inherent in the prior art.

SUMMARY OF THE INVENTION

The present invention solves the problems inherent in the prior art by providing an apparatus and method for decoding single or multi-frequency signals without the use of analog bandpass filters. The apparatus of the present invention can be, for example, a microcontroller in an embedded application.

The method of the present invention is composed of a number of steps. First, an incoming (analog) signal is received and transformed into binary signals (1 or 0) at specific instances of time. The incoming binary signal is compared to a pre-defined expected (binary) signal at each time step. The incoming and expected bit values for each time step are then compared and the comparison result is stored as part of a frequency response table. The comparison values are then summed and, if the summed value exceeds a pre-defined threshold, the incoming and expected signals are declared a match. Otherwise, the signals are declared a mis-match. Other pre-, concurrent-, or post-processing steps can be implemented with the present invention in order to add additional functionality.

Other and further objects, features and advantages will be apparent from the following description of presently pre-

DETAILED DESCRIPTION OF THE INVENTION

Figure 1:
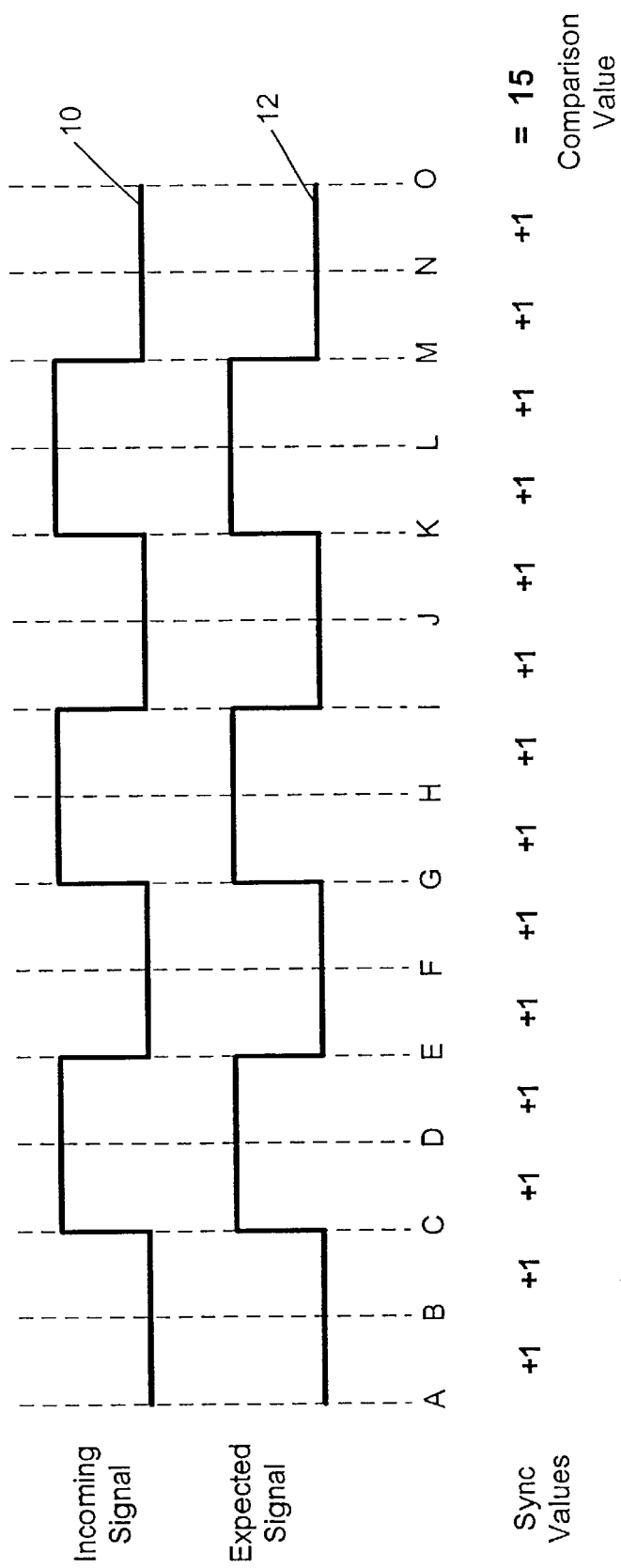
FIG. 1 illustrates a comparison of two matching waveforms of the present invention.

Decoding DTMF is usually done with the aid of analog bandpass filters as well as decision-making logic. It is possible with the method and apparatus of the present invention to replace these filter with a microcontroller utilizing the specialized software of the present invention. Moreover, the method of the present invention is equally useful for detecting frequencies in single-frequency as well as multi-frequency signals.

Operation

The method of the present comprises several steps. First, samples are taken from an incoming signal at a rate above the Nyquist frequency for the highest frequency tone (256 $\mu$s sample time). The samples need only be of 1 bit resolution (either a logic ONE or ZERO). This can be accomplished using a comparator, an ADC (using the Most Significant bit), or even with a digital I/O pin.

The incoming bit is then compared against the expected value for that bit.

The aim of the present invention is to decode the DTMF signals without the need for external filtering equipment, e.g., a DTMF decoder IC, and allow enough remaining processor memory and overhead within the microprocessor to incorporate other features such as Call Routing, Identification, FSK Demodulation, etc.

The method of the present invention can be implemented on, for example, the PICmicro™ mid-range microprocessor/microcontroller family manufactured by Microchip Technology of Chandler, Ariz. However, the method and apparatus of the present invention can use a wide variety of processors and microcontrollers that utilize software written in a variety of languages including, but not limited to, C/C++ and assembly. Moreover, some or all of the functionality that is embodied within software of the preferred embodiment can just as easily be embodied in firmware and/or hardware in alternate embodiments.

Within the software of the present invention, the data is collected one sample at a time and acted upon immediately. The sample rate, according to Nyquist, should be at least twice the highest frequency in the range. In the case of standard DTMF tones, the highest frequency is 1633 Hz, the sample frequency should therefore be greater than 3.3 KHz or approximately every 300 $\mu$S. The software employs various features of the hardware upon which it runs.

For illustration purposes, this discussion will use the system calls and functions of a PICmicro™ device. Initially, the Timer0 function is used to create the sample trigger via an Interrupt. This allows one to use the TMR0 Prescaler to set an appropriate sample rate, for example 256 $\mu$S/4 KHz which is easy to achieve with the PICmicro. Next, the input is scanned, from the input mechanism and is then stored in a RAM bit for comparison. It should be noted that the input mechanism can be a comparator, an Analog-to-Digital converter ("ADC"), digital I/O, or any other device capable of sampling.

In the preferred embodiment of the present invention, comparison is performed with the well known "modified Goertzel algorithm." In the modified Goertzel algorithm, a number of inputs of 1 bit resolution are provided (the incoming signal), which must be converted from the time domain into a component of frequency. This conversion operation can be accomplished by a 1 bit Discrete Fourier Transform (DFT). In a PICmicro microcontroller, this involves building a frequency response table in RAM as the samples are taken. Each incoming bit is compared against the expected result for each of the 8 frequencies.

The expected values are held in memory, preferably in RETLW tables, although other types of tables can be used with equivalent effect with the present invention. The expected values can be generated and tabulated by hand or with the aid of a digital computer. Typically, these tables are produced from a spreadsheet using theoretical SINE and COSINE waves at the given DTMF frequencies. For this example, the table can be generated using a standard spreadsheet program such as Microsoft Excel® which is manufactured by the Microsoft Corporation of Redmond, Wash. The following formula can be used to produce the rounded expected signals:

$$=\text{TRUNC}(\text{POWER}(2,\$B\$10)*\text{SIN}(2*\text{PI}()*\$B\$3*H2),0)$$

Where B10 ($B$10) is the resolution—1 bit in this case; B3 ($B$3) Frequency in Hertz (e.g. 1633); and Hx is the time (varies by Row in the spreadsheet) of the sample at that instant (in seconds). By applying the above formula for the specific frequencies, one obtains a table of SINE and COSINE waves at each of the eight target frequencies (for DTMF), rounded into 0's and 1's. These can then be manipulated into the code in RETLW tables. An example run of the above formula (for SINE) for the first set of ten bits is shown in Table 4.

TABLE 4

| Bit Num. | Time (sec.) | Frequency (Hz) | | | | | | | |
|---|---|---|---|---|---|---|---|---|---|
| | | 697 | 770 | 852 | 941 | 1209 | 1336 | 1477 | 1633 |
| 1 | 0.0000 | 0 | 0 | 0 | 0 | 0 | 0 | 0 | 0 |
| 2 | 0.0003 | 1 | 1 | 1 | 1 | 1 | 1 | 0 | 0 |
| 3 | 0.0006 | 0 | 0 | 0 | 0 | −1 | −1 | −1 | 0 |
| 4 | 0.0009 | −1 | −1 | −1 | −1 | 1 | 1 | 1 | 0 |
| 5 | 0.0012 | −1 | 0 | 0 | 1 | 0 | −1 | −1 | 0 |
| 6 | 0.0015 | 0 | 1 | 1 | 1 | −1 | 0 | 1 | 0 |
| 7 | 0.0018 | 1 | 1 | 0 | −1 | 1 | 1 | −1 | 0 |
| 8 | 0.0021 | 0 | −1 | −1 | 0 | 0 | −1 | 1 | 0 |
| 9 | 0.0024 | −1 | −1 | 0 | 1 | −1 | 1 | 0 | 0 |
| 10 | 0.0027 | −1 | 0 | 1 | 0 | 1 | −1 | 0 | 1 |

It should be noted that alternate tables can be made that rearrange these values or utilize other values to suit the particular application without departing from the scope of the present invention.

In its simplest form, each sample is rounded to either a "1" or "0" and is compared to the 1 or 0 in the RETLW tables. A "match" is declared if the sample value matches the value in the table. Each "match" increments an accumulator variable for that particular frequency, typically by a sync value of +1. A "non-match" will decrement the same variable (for that particular frequency), typically by adding a sync value of −1.

Figure 2:
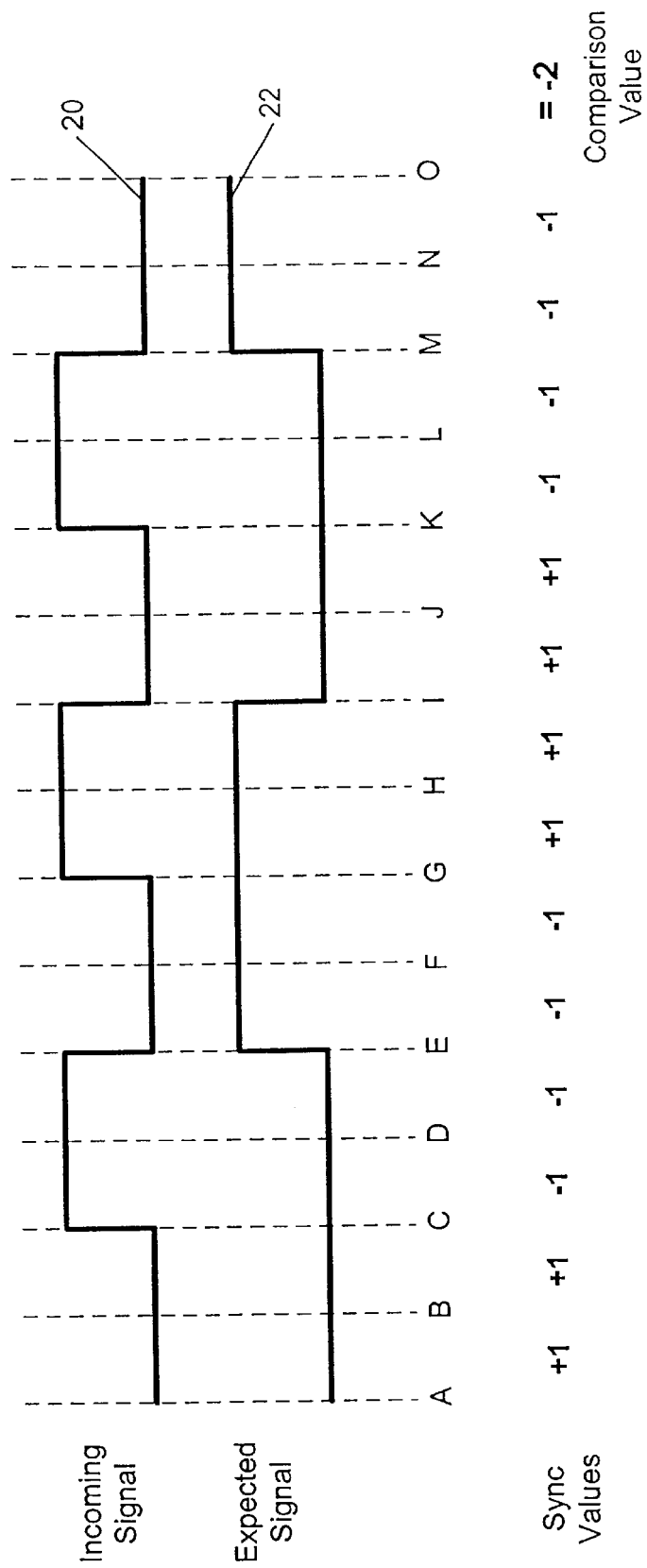
FIG. 2 illustrates a comparison of two mismatching waveforms of the present invention.

Examples of matching and mismatching are illustrated in FIGS. 1 and 2, respectively. In FIG. 1, the incoming waveform 10 is measured periodically at time steps A–O. There is an expected waveform 12 for each and every instance as well, i.e., at time steps A–O. The input We can see that FIG. 1 yields a large sum because both waveforms are in phase and have the same period and thus a +1 sync value at each time step A–O for a comparison value (total) of +15. Contrast the incoming waveform 20 of FIG. 2 and the expected waveform 22 that are off frequency. In FIG. 2, where only time steps A–B and G–J are in sync and yielding sync values of +1, whereas time steps C–F and K–O are out of sync and yield sync values of −1 for a comparison (total) value of −2. Given more samples, the comparison value for the waveforms of FIG. 2 will continue to move toward and around zero.

One should compare each incoming bit with the expected SINE and COSINE bits for each of the 8 frequencies—a grand total of 16 comparisons for each incoming bit. The reason for comparing the incoming bit with the SINE and COSINE of each frequency is that even if there is an exact frequency match, the phase of the incoming signal affects the magnitude of the sum of products (i.e., the comparison value). In the extreme case where the signal is a match, there are positions of phase that would cause the SINE accumulator to sum to zero. However, if one checks against the COSINE as well, this will give a large magnitude of matches at 90 degrees and the sum of SINE and COSINE results will still prove the match. Discrepancies between the divergence between the SINE and COSINE results would indicate a mis-match.

Figure 3:
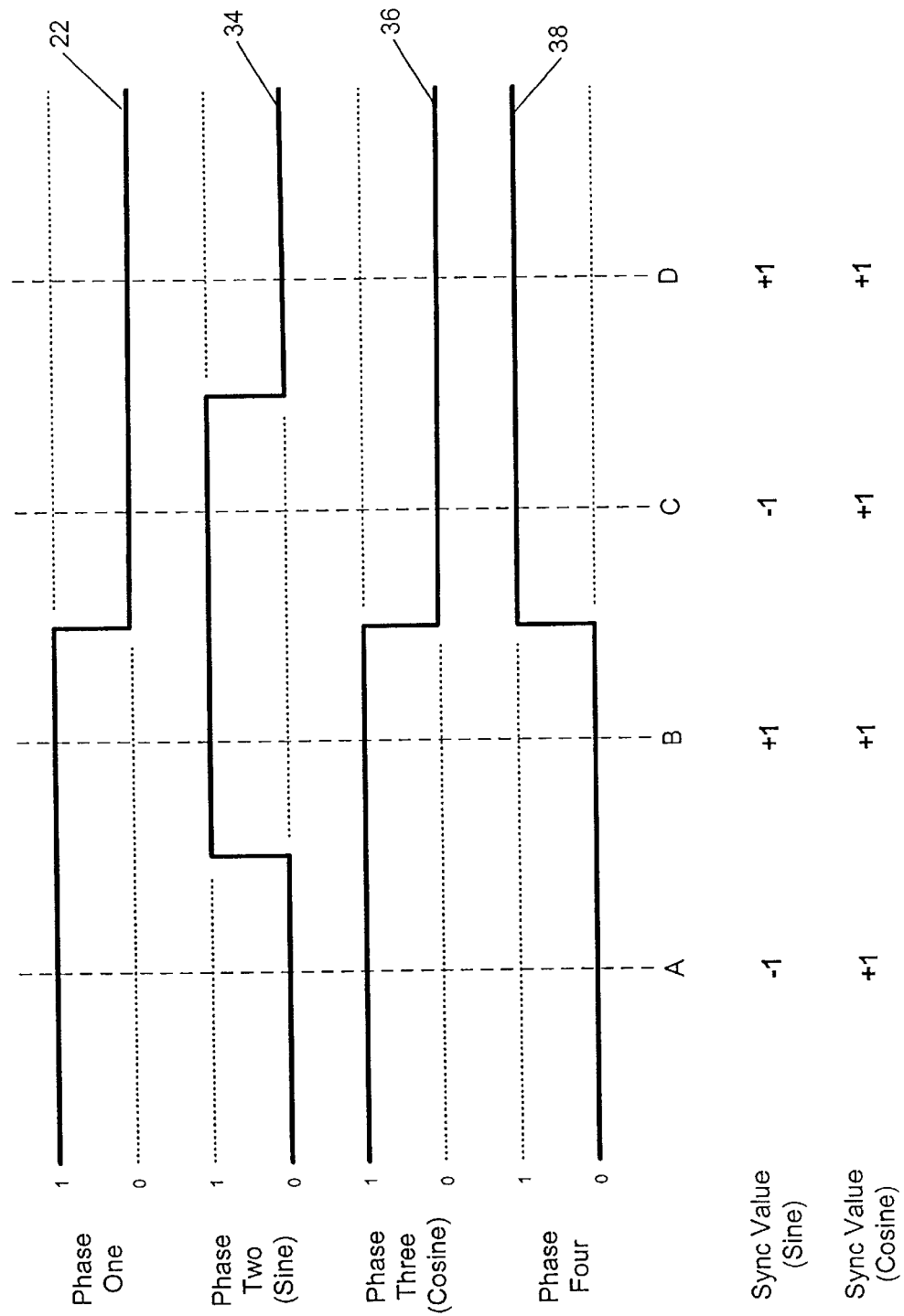
FIG. 3 illustrates a comparison of a predetermined waveform with its SINE, COSINE, and advance phase waveforms.

In FIG. 3, the first signal Phase One 30 is a cosine waveform. Phase Two 32 is the same but lagging Phase One by 90 degrees and is thus the SINE of Phase One 30. Phase Three 34 is lagging an additional 90 degrees behind Phase Two 32 (i.e., 180 degrees behind Phase One 30), and Phase Four 36 is 90 degrees leading Phase One 30. FIG. 3 shows how the value of Phase One 30 is compared against the SINE and COSINE templates in the time domain. This comparison with 1 bit resolution has the effect of a Discrete Fourier Transform (DFT) into the frequency domain.

At sample point A, Phase One 30 of FIG. 3 is a non-match with the SINE template 32 and is awarded a sync value of −1 so the RAM accumulator for that frequency is decremented. There is, however, a match between the Phase One 30 signal with the COSINE 34, so a sync value of +1 is awarded and the COSINE accumulator for that frequency is incremented. The same comparison is made for the for four sample points of this example. In normal applications, however, one would need many more samples to ensure an accurate response.

Summing the results from the SINE and COSINE comparisons for each of the eight frequencies will begin to build a frequency response table in RAM as illustrated in FIG. 3. Comparisons to the SINE and COSINE values eliminate the potential mis-match result for truly matching signals that are only out of phase with the expected values. Over time, and given enough samples, one winning frequency will emerge each from the low-band and high-band frequency ranges. However, if there are not two clear winners, no output will be given. The process of decision making is straightforward and requires the detection of the winning frequencies, and confirmation that the winners are above a set threshold.

It should be noted that the method of the present invention is applicable to applications other than DTMF detection. The method of the present invention can be applied to other frequency/response applications as well. I.e., the method of the present invention is applicable to whatever application calls for a bandpass filter.

Figure 4:
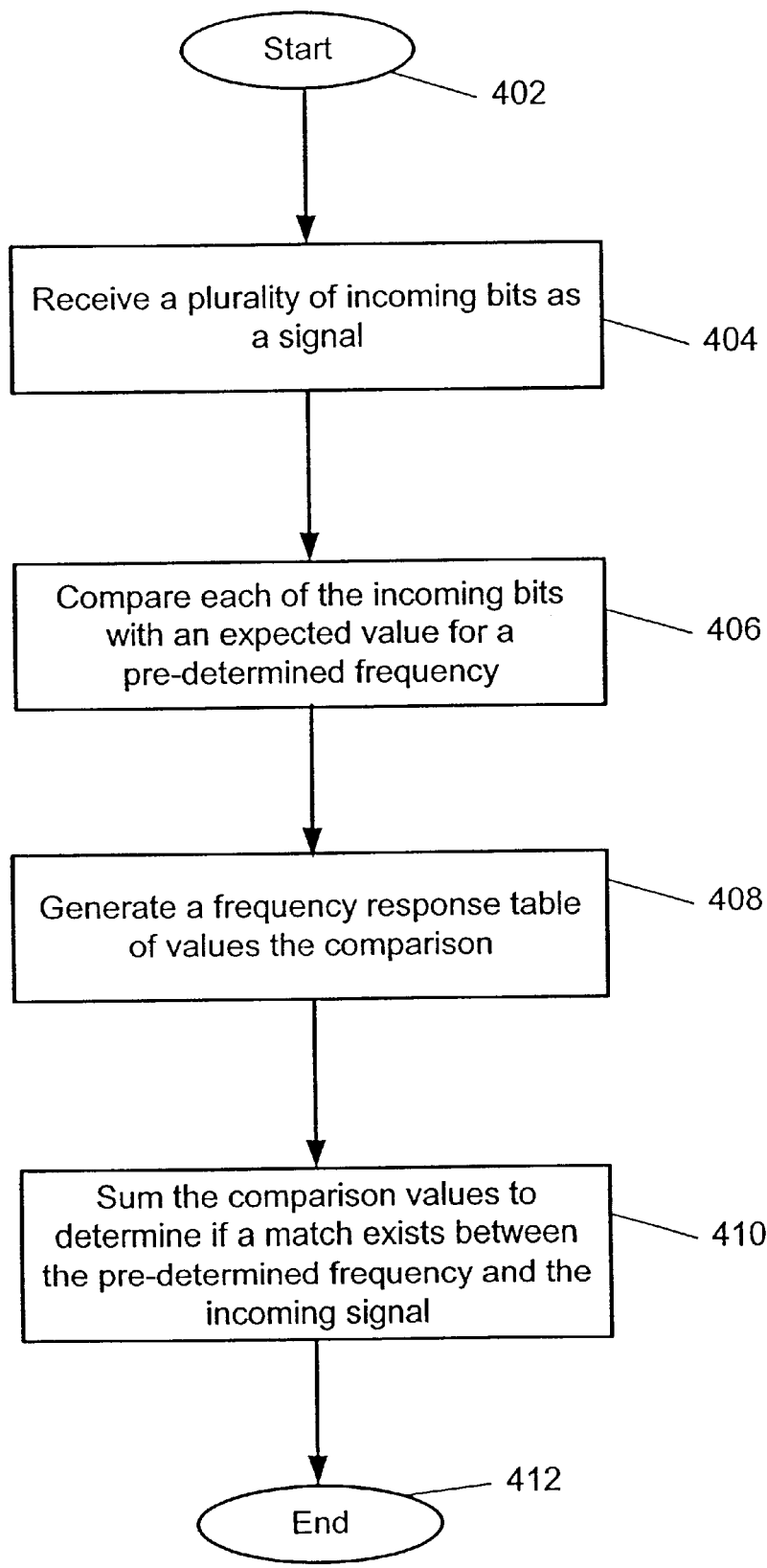
FIG. 4 is a flowchart of the method of the present invention.

The method of the present invention is illustrated in FIG. 4. The method starts at step 402. First a plurality of bits are received as an incoming signal, step 404. As mentioned previously, the incoming analog signal is pre-processed from an analog signal into a digital signal, preferably in the form of a single bit value, either 1 or 0. Next, the incoming bits, typically one at a time, are then compared to each of the expected values for a pre-determined frequency to obtain a comparison value for that specific time step in step 406. Over time, the sequence of comparison values is used to generate a frequency response table, step 408. From the frequency response table, a determination is made if the incoming signal matches (or mismatches) the expected signal, step 410. The method then ends in step 412. Additional steps (after step 410) can be implemented for decision-making logic and other post-processing activities. Moreover, additional sub-steps can be implemented before, between, or within the existing steps illustrated in FIG. 4 to add additional functionality. For example, the comparison step 406 can be expanded to encompass comparing each of the incoming bits with a SINE of the expected value for a pre-determined frequency as well as comparing each of the incoming bits with a COSINE of the expected value for each pre-determined frequencies. Moreover, additional sub-steps can encompass performing step 406 for each of the DTMF frequencies in order to generate additional comparison tables and enable sums and determinations of matching/mismatching for all of the DTMF frequencies. Another example of a pre-processing step would be for the pre-defined (expected) waveform binary signals to be generated and store in RAM before the step of receiving the incoming signal.

The following is an example implementation of the method and apparatus of the present invention on a PICmicro microcontroller. It will be clear to those skilled in the art that alternate examples can be implemented without departing from the scope and spirit of the present invention.

Implementation

During initialization, (INIT), user RAM is cleared using indirect addressing. The File Select Register (FSR) is incremented and the pointer contents (INDF) cleared. The loop runs to the end of the specified RAM area. In this case the end is at O x4F. This loop is optional, but it is a good way to ensure your variables are clear at the beginning of your conversion, and it only uses about 8 lines of code. Thereafter, the input peripheral (comparator, ADC, etc.) is set up, as are the times which need to be used.

The comparator on the PIC16C662 device (manufactured by Microchip Technology Inc. of Chandler, Ariz.) is ideal for analog inputs. Internally, the peripheral has reverse biased diodes, so the analog input must be between Vdd and Vss. The hardware used to develop this invention employed a amplifier (specifically the MCP602 manufactured by Microchip Technology Inc.) and a series resistor to ensure the correct voltage level and the correct current level that flowed into the device. The voltage reference is a resistor ladder network and is configured using the VRCON register. The trigger level is largely dependent on the signaling supplied to the device. If 0 v–5 v levels are used, the reference should be set close to ground, but above any noise. This example uses a Low Range reference (VRR=1) and a value of VR=2 ie Vdd(VR/24)=0.42 v. Anything above 0.42 v will give a logic 1 as the sampled bit.

An alternative ADC example (in lieu of the comparator example discussed above) uses a single channel of the 10 bit ADC. The ADC doesn't have a programmable internal voltage reference, but as we only need a single bit of resolution, it's possible to simply test for a result above a level specified in the source code. This example tests for a result above zero, and although this is not ideal for the reasons specified above, it can work.

As the sample time in this application is 256 $\mu S$, the OPTION register is used to ensure an accurate scaling for Timer 0, and the interrupt for the timer peripheral is enabled.

The main routine is a simple loop. A loop is used so that other functions can be performed if the desired application is more complex than the simple decoder illustrated here. One may simply add their own code in the main section. However, it should be noted that if extra code is executed here, the microcontroller cannot be as responsive to Timer interrupts. The interrupt service routine (ISR) saves and restores the W and STATUS registers, but may need to include other registers if more complex code is added. Once the interrupt routine has been executed and a sample taken, a user flag is detected on returning to the MAIN routine. This is the cue to perform the Goertzel comparison. The device runs with a 16 MHz oscillator mainly because the comparison needs to be completed before the next interrupt.

Another routine of this example is illustratively labeled GOERTZEL and has two bytes and one bit passed to it. The two bytes are the expected SINE and COSINE values for that sample, the single bit is the sampled signal level, and is held in a variable called BYTE, bit 0. This level is tested against the other 16 levels, in turn, using rotations, and the 16 variables dedicated to the accumulators are incremented or decremented accordingly. These accumulators can be visualized as the frequency response table. Once all of the samples have been acted upon, the SINE accumulator for each frequency is summed unsigned with its COSINE counterpart. This summing is performed in a routine illustratively labeled ACCUM_LOW. Again the FSR is used extensively to address the RAM locations and keep the length of code to a minimum. Given that the sum totals, now held in the COSINE variable for each frequency can be a positive or a negative, they need to be made positive so that they can be easily compared during the output stage. As there are never more than 128 samples taken in this example, the most significant bit can be used to determine the sign, and if necessary, "flipped" positive around zero.

The output uses the FSR again to decide if there was a pair of winning frequencies, and if the winners were above a certain threshold level. The threshold level for a certain match using the full 128 byte tables was set at 0x40 (Decimal 64). This means that the sum of the SINE and COSINE comparison must be above a specific level for the match to be proven. In theory, the maximum matched sum (in the case of square waves) would be Decimal 128, so a threshold of half the maximum works well. Equally, if the half tables are used to reduce the conversion time, the threshold should be altered accordingly. However, it should be noted that this makes the system more susceptible to errors.

In order to use the "half-tables" approach, the end point for the counter needs to be changed in the Interrupt Service Routine (ISR). An illustrative variable TABLECOUNTER is used to determine the offset used when the table is called. This counter is checked once the table values have been returned, and if the specified number of passes have been competed, a flag is raised to tell the device to finish the process and output the results. Changing the tested value from Decimal 128 to 64, will have the desired effect.

In a typical application of the present invention, there are a number of other factors to be considered. While this example should be seen as a starting point for decoding DTMF tones. Alternate embodiments of the present invention can employ a trigger mechanism to tell the microcontroller when to begin converting the incoming signal for DTMF presence. For example, with Caller ID, the tone "D" is expected after a "space" lasting more than 100 mS. The user may wish to insert software to detect this space before the DTMF conversion is run.

The oscillator frequency of 16 MHz is required for this DTMF example. Different frequencies, however, may be required depending upon the specific application. The way in which the software is constructed for these examples utilizes the time between interrupts to convert the last incoming bit sample. This means that the Goertzel conversion has 256 microsecond ($\mu S$) to complete before the next incoming bit is received. Given the number of instructions required to perform this, the minimum operating frequency of the microcontroller is a little over 8 MHz. 16 Mhz was chosen because it's very easy to produce the 256 $\mu S$ interrupt period using the timer at this frequency. It is possible to rearrange the software to take in all the incoming samples and store them in RAM, then convert them all afterwards. This makes the system less dependent on the oscillator frequency, but will increase the total conversion time.

Figure 5:
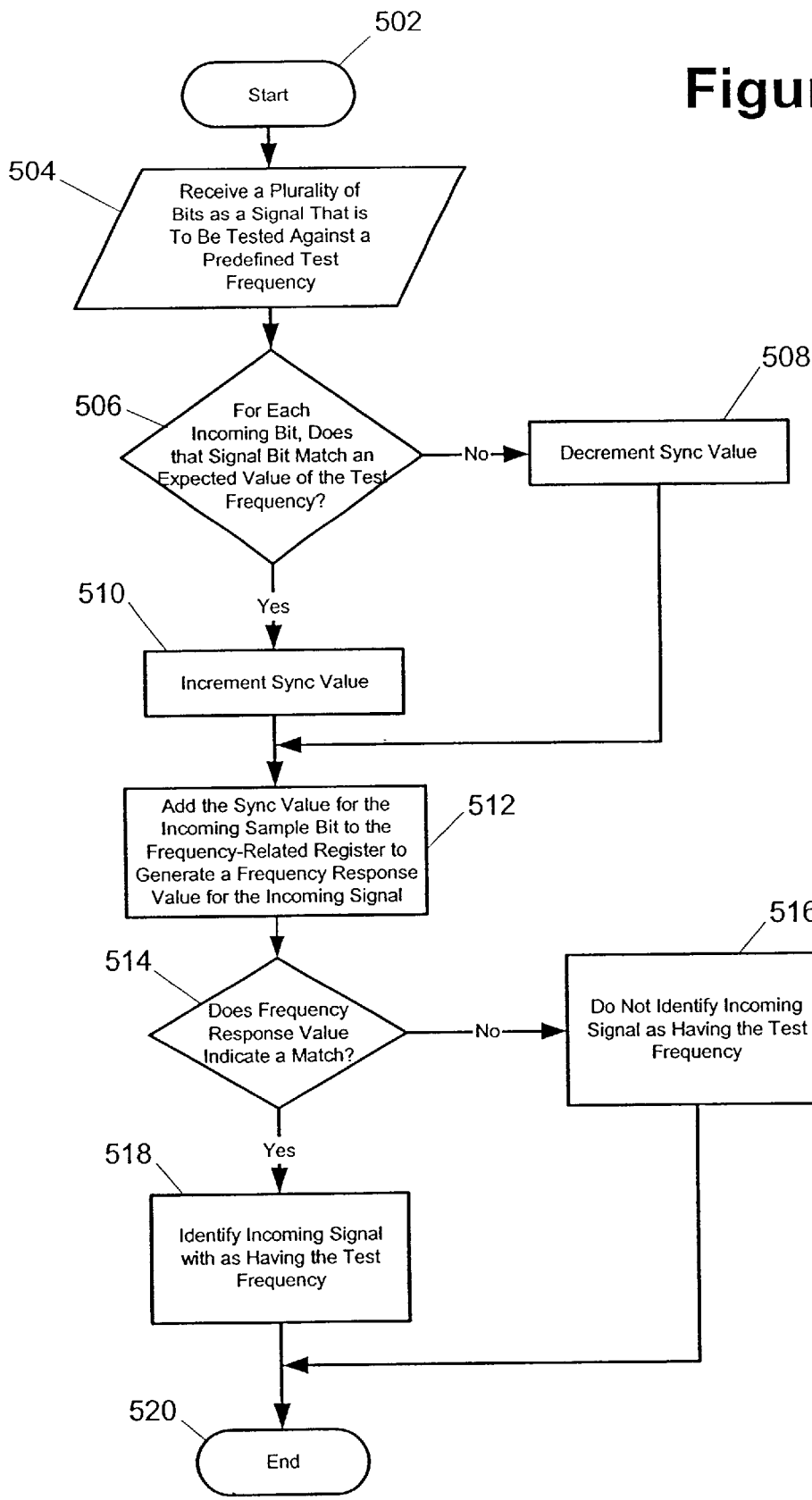
FIG. 5 is a flowchart of an alternate embodiment of the method of the present invention.
Figure 6:
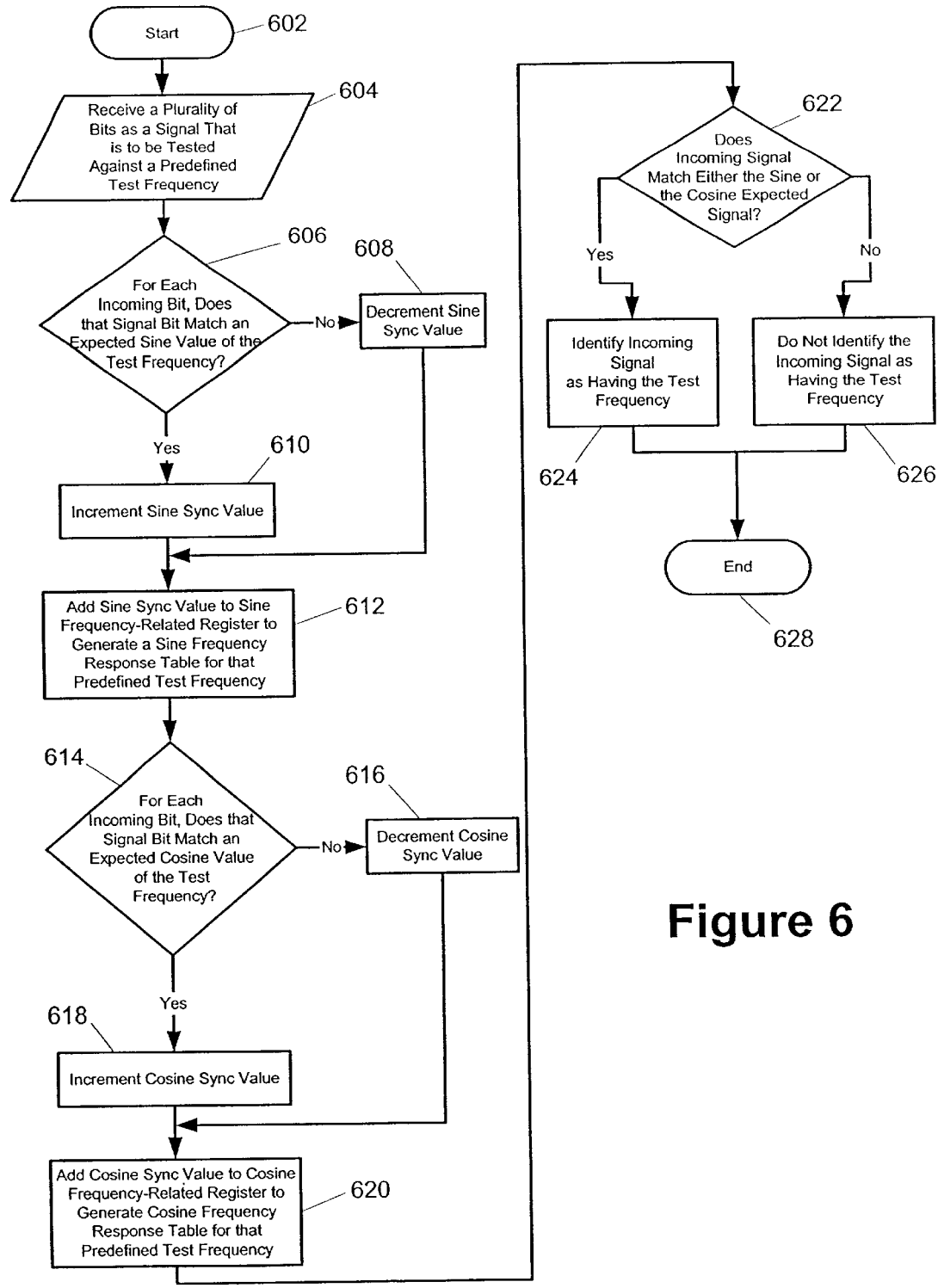
FIG. 6 is a flowchart of another alternate embodiment of the method of the present invention.
Figure 7:
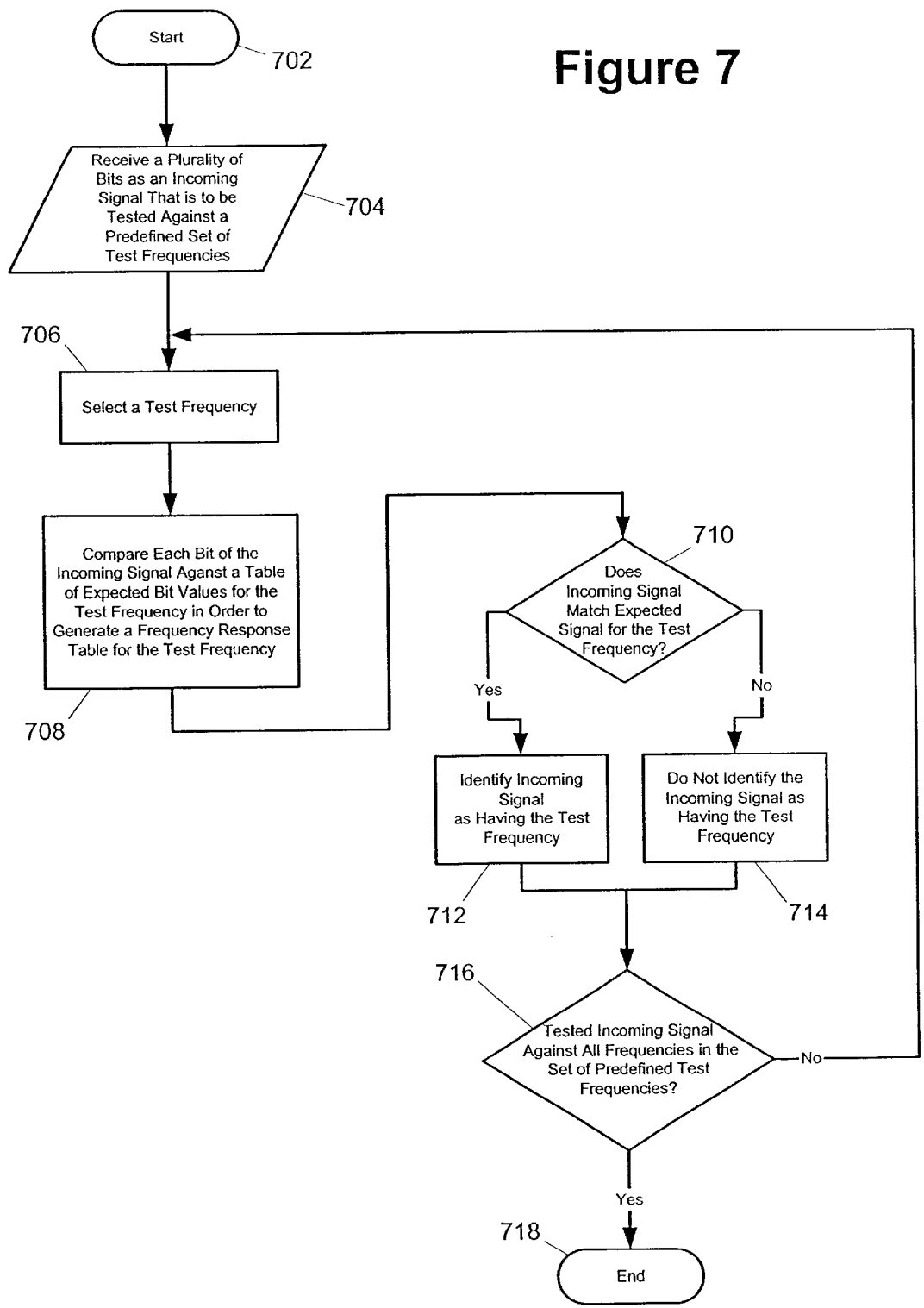
FIG. 7 is a flowchart of another alternate embodiment of the method of the present invention.

While FIG. 4 shows a flowchart that illustrates the generic method of the present invention, FIGS. 5, 6, and 7 illustrate alternate embodiments that are based upon the method illustrated in FIG. 4. Specifically, FIG. 5 starts with step 502. First, in step 504, an incoming signal is received in the form of a plurality of bits. This incoming signal is to be compared against a set of bits that represents a signal of a predefined frequency. The bits from the predefined (expected or comparison) frequency is generated either at boot time or from a pre-calculated or allocated table as defined above. The table has the expected bits as a function of time. These expected bit values are then compared to the incoming bits in a sequential manner, effectively mimicking or duplicating a time-based comparison. Next, in step 506, each of the incoming bits is compared to the corresponding time-based expected value retrieved from the expected value table for the test frequency. If the comparison is positive (i.e., the incoming bit value equaled the expected value) then the sync value is positive and the register containing the running sync value (i.e., the sync value that is summed over the time period) is incremented, step 510. Otherwise, the sync value is negative and the sync value register is decremented, step 508.

Overtime, each of the incoming bits will be compared to their corresponding expected values to generate a frequency response value in the sync value register, step 512. This value is then compared to a predetermined threshold value, step 514. If the frequency response value exceeds the threshold value, then the incoming signal is identified (tagged) as having the test frequency as one of its components, step 518. Otherwise, the incoming signal is identified as not having the test frequency as one of its components, step 518. Alternatively, the incoming signal may be tagged if it does not contain the test frequency and not tagged, or tagged differently, if it does contain the test frequency. Thereafter, the process ends in step 520.

The method of the present invention is enhanced if the incoming signal is compared to two separate expected table values. In this alternative method, one of the test stream values that is out of phase with the other test value stream. This eliminates the problem of an incoming signal having the requisite frequency being judged not to have that frequency component because the incoming and test signals were out of phase with each other (resulting in a frequency response value of near zero). By testing the incoming signal to two out-of-phase signals, there is a greater chance that the incoming signal will match closely with at least one of the two test signals, thereby prompting proper identification of the frequency component.

Referring to FIG. 6, the method starts at step 602. Thereafter, in step 604, an incoming signal in the form of a plurality of bits is received. As before, this incoming signal is to be compared against a set of bits that represents a signal of a predefined frequency. The bits from the predefined (expected or comparison) frequency is generated either at boot time or from a pre-calculated or allocated table as defined above. The table has the expected bits as a function of time. These expected bit values are then compared to the incoming bits in a sequential manner, effectively mimicking or duplicating a time-based comparison. Next, in step 606, each of the incoming bits is compared to the corresponding time-based sine expected value retrieved from the sine expected value table for the test frequency. If the comparison is positive (i.e., the incoming bit value equaled the sine expected value) then the sine sync value is positive and the register containing the running sine sync value (i.e., the sine sync value that is summed over the time period) is incremented, step 610. Otherwise, the sine sync value is negative and the sine sync value register is decremented, step 608.

Over time, each of the incoming bits will be compared to their corresponding sine expected values to generate a frequency response value in the sine sync value register, step 612. Next, in step 614, a similar check of the incoming signal bit is made against the corresponding cosine expected value. If the comparison is positive (i.e., the incoming bit value equaled the cosine expected value) then the cosine sync value is positive and the register containing the running cosine sync value (i.e., the cosine sync value that is summed over the time period) is incremented, step 618. Otherwise, the cosine sync value is negative and the cosine sync value register is decremented, step 616.

Over time, each of the incoming bits will be compared to their corresponding sine expected values to generate a frequency response value in the sine sync value register, step 620. Each of these values (for sine and cosine) are then compared to a predetermined threshold value, step 622. If either of the sine or cosine frequency response values exceed the threshold value, then the incoming signal is identified (tagged) as having the test frequency as one of its components, step 624. Otherwise, the incoming signal is identified as not having the test frequency as one of its components, step 626. Alternatively, the incoming signal may be tagged if it does not contain the test frequency and not tagged, or tagged differently, if it does contain the test frequency. Thereafter, the process ends in step 628. It should be noted that the sine comparison need not necessarily precede the cosine comparison. The two comparisons can be performed in any order without degrading the quality of the result. Normally, however, the comparison process is performed either sequentially or performed in parallel for each bit of the incoming signal.

FIG. 7 illustrates the methods of FIGS. 5 and 6 performed for a plurality of test frequencies. The process starts at step 702. Thereafter, in step 704, an incoming signal in the form of a plurality of bits is received. As before, this incoming signal is to be compared against a set of bits that represents a signal of a predefined frequency. The bits from the predefined (expected or comparison) frequency is generated either at boot time or from a pre-calculated or allocated table as defined above. The table has the expected bits as a function of time. These expected bit values are then compared to the incoming bits in a sequential manner, effectively mimicking or duplicating a time-based comparison. Unlike the methods discussed above, the alternate method illustrated in FIG. 7 performs the incoming bit signal/expected value comparison on multiple test frequencies. If detection speed is important, it is preferable to perform the multifrequency check in parallel (i.e., multiplexing the incoming signal to several test instances of the method of the present invention so that all of the frequencies of the incoming signal are tested simultaneously. If detection speed is not as important, then a serial or sequential detection process can be implemented, using longer stream of input signal bits. The latter method is useful if computing resources on the device implementing the method of the present invention is limited. In some cases, however, a combination of parallel and sequential testing my be preferable. For example, testing for a first set of two or three test frequencies can be performed, and thereafter subsequent sets of test frequencies can be examined.

FIG. 7 illustrates a sequential testing algorithm. A test frequency is selected in step 706. Thereafter, the incoming bits are examined as discussed above, step 708. In step 710, a check is made to determine if the test frequency is a component of the incoming signal. If so, the incoming signal is identified as having the test frequency, step 712. Otherwise, the incoming signal is identified as not having the test frequency as a component, step 714. A check is then made to determine whether or not all of the test frequencies have been examined. If not, execution is branched back to step 706 where another test frequency is selected and the comparison cycle starts anew. Otherwise, execution ends in step 718. As mentioned before, FIG. 7 illustrates a sequential testing cycle. However, with sufficient parallelization, the number of testing cycles can be reduced to as low as one.

The present invention, therefore, is well adapted to carry out the objects and attain both the ends and the advantages mentioned, as well as other benefits inherent therein. While the present invention has been depicted, described, and is defined by reference to particular preferred embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for decoding multi-frequency signals, said method comprising the steps of:
   (a) receiving a plurality of incoming bits as a signal;
   (b) comparing each of said incoming bits with an expected value for a pre-determined frequency for each of said incoming bits;
   (c) generating a frequency response table of values from said comparison; and
   (d) summing said comparison values to determine if a match exists between said pre-determined frequency and said incoming signal.

2. A method for decoding multi-frequency signals as in claim 1, wherein said incoming signal is received at a rate higher than the Nyquist frequency for the highest frequency tone.

3. A method for decoding multi-frequency signals as in claim 1, said method further comprising the step of:
   before said step (a), generating a table of expected bit values for a plurality of pre-determined frequencies; and
   storing said table of expected bit values.

4. A method for decoding multi-frequency signals as in claim 1, wherein said step of comparing utilizes a modified Goertzel algorithm.

5. A method for decoding multi-frequency signals as in claim 1, wherein said step of comparing further comprises the steps of:
   (b1) comparing each of said incoming bits with a SINE of said expected value for a pre-determined frequency for each of said incoming bits; and
   (b1) comparing each of said incoming bits with a COSINE of said expected value for a pre-determined frequency for each of said incoming bits.

6. A method for testing a multi-frequency signal, said method comprising the steps of:
   (a) generating a test frequency table, said test frequency table having expected bit values corresponding to a test frequency;
   (b) receiving an incoming signal in the form of a plurality of incoming bits;
   (c) for each of said incoming bits, comparing said incoming bit to a corresponding expected bit value;
   (d) if said incoming bit value is equivalent to said expected bit value, then incrementing a sync value register, otherwise decrementing said sync value register; and
   (e) determining if the value in said sync value register exceeds a predefined threshold value, if so, then identifying said incoming signal as having said test frequency.

7. The method according to claim 6, wherein if said value in said sync value register does not exceed said threshold, then identifying said incoming signal as not having said test frequency.

8. A method for testing a multi-frequency signal, said method comprising the steps of:
   (a) generating a test frequency table, said test frequency table having expected bit values corresponding to a test frequency;
   (b) receiving an incoming signal in the form of a plurality of incoming bits;
   (c) for each of said incoming bits, comparing said incoming bit to a corresponding sine expected bit value;
   (d) if said incoming bit value is equivalent to said sine expected bit value, then incrementing a sine sync value register, otherwise decrementing said sine sync value register;
   (e) for each of said incoming bits, comparing said incoming bit to a corresponding cosine expected bit value;
   (f) if said incoming bit value is equivalent to said cosine expected bit value, then incrementing a cosine sync value register, otherwise decrementing said cosine sync value register;
   (g) determining if the value in said sine sync value register exceeds a predefined threshold value, if so, then identifying said incoming signal as having said test frequency; and
   (h) determining if the value in said cosine sync value register exceeds a predefined threshold value, if so, then identifying said incoming signal as having said test frequency.

9. The method according to claim 8, wherein if said values in said sine sync value register and said cosine sync value register both do not exceed said threshold, then identifying said incoming signal as not having said test frequency.

10. The method of claim 6, wherein said method is performed for multiple test frequencies.

11. The method of claim 8, wherein said method is performed for multiple test frequencies.

12. A method for decoding single-frequency signals, said method comprising the steps of:
   (a) receiving a plurality of incoming bits as a signal;
   (b) comparing each of said incoming bits with an expected value for a pre-determined frequency for each of said incoming bits;
   (c) generating a frequency response table of values from said comparison; and
   (d) summing said comparison values to determine if a match exists between said pre-determined frequency and said incoming signal.

13. A method for decoding single-frequency signals as in claim 12, wherein said incoming signal is received at a rate higher than the Nyquist frequency for the highest frequency tone.

14. A method for decoding single-frequency signals as in claim 12, said method further comprising the step of:
   before said step (a), generating a table of expected bit values for a plurality of pre-determined frequencies; and
   storing said table of expected bit values.

15. A method for decoding single-frequency signals as in claim 12, wherein said step of comparing utilizes a modified Goertzel algorithm.

16. A method for decoding single-frequency signals as in claim 12, wherein said step of comparing further comprises the steps of:
   (b1) comparing each of said incoming bits with a SINE of said expected value for a pre-determined frequency for each of said incoming bits; and
   (b1) comparing each of said incoming bits with a COSINE of said expected value for a pre-determined frequency for each of said incoming bits.

17. A method for testing a single-frequency signal, said method comprising the steps of:
   (a) generating a test frequency table, said test frequency table having expected bit values corresponding to a test frequency;
   (b) receiving an incoming signal in the form of a plurality of incoming bits;
   (c) for each of said incoming bits, comparing said incoming bit to a corresponding expected bit value;
   (d) if said incoming bit value is equivalent to said expected bit value, then incrementing a sync value register, otherwise decrementing said sync value register; and
   (e) determining if the value in said sync value register exceeds a predefined threshold value, if so, then identifying said incoming signal as having said test frequency.

18. The method according to claim 17, wherein if said value in said sync value register does not exceed said threshold, then identifying said incoming signal as not having said test frequency.

* * * * *